United States Patent
Wang et al.

(10) Patent No.: US 11,023,888 B2
(45) Date of Patent: Jun. 1, 2021

(54) SYSTEMS AND METHODS FOR MANAGEMENT AND RECYCLING OF PAYMENT TRANSACTIONS

(71) Applicant: Vantiv, LLC, Cincinnati, OH (US)

(72) Inventors: Fengzhong Wang, Boston, MA (US); Stefan Kostadinov Karaivanov, Boston, MA (US); Snehal Desai, Westford, MA (US)

(73) Assignee: Worldpay, LLC, Symmes Township, OH (US)

( * ) Notice: Subject to any disclaimer, the term of this patent is extended or adjusted under 35 U.S.C. 154(b) by 12 days.

(21) Appl. No.: 14/734,096

(22) Filed: Jun. 9, 2015

(65) Prior Publication Data

US 2016/0364724 A1 Dec. 15, 2016

(51) Int. Cl.
*G06Q 20/40* (2012.01)
*G06Q 20/22* (2012.01)

(52) U.S. Cl.
CPC .............. *G06Q 20/40* (2013.01); *G06Q 20/22* (2013.01)

(58) Field of Classification Search
CPC ....... G06Q 20/40; G06Q 20/405; G06Q 20/22
See application file for complete search history.

(56) References Cited

U.S. PATENT DOCUMENTS

| | | | | |
|---|---|---|---|---|
| H2252 H * | 1/2011 | Bohanan | ............... | G06Q 40/00 705/40 |
| 8,260,694 B1 * | 9/2012 | Lauer | ................... | G06Q 30/06 705/34 |
| 8,639,621 B1 * | 1/2014 | Ellis | ................... | G06Q 30/0255 705/41 |
| 2009/0157555 A1 * | 6/2009 | Biffle | .................... | G06Q 20/40 705/67 |
| 2009/0177562 A1 * | 7/2009 | Peace | ................... | G06Q 20/382 705/30 |
| 2011/0022515 A1 * | 1/2011 | Tallitsch | ................ | G06Q 20/02 705/40 |
| 2011/0295743 A1 * | 12/2011 | Patterson | ............. | G06Q 20/102 705/40 |
| 2012/0072348 A1 * | 3/2012 | Bernstein | ............... | G06Q 20/20 705/44 |
| 2013/0024289 A1 * | 1/2013 | Cueli | ................... | G06Q 20/027 705/14.65 |

(Continued)

OTHER PUBLICATIONS

"New visa merchant service solves problem of updating payment card information; visa account updater strengthens merchants' customer retention efforts", Business Wire, Jun. 18, 2003. (Year: 2003).*

(Continued)

*Primary Examiner* — Eric T Wong
(74) *Attorney, Agent, or Firm* — Bookoff McAndrews, PLLC

(57) ABSTRACT

Systems and methods disclosed herein for managing recurring payment transactions. The recurring payment transaction can be based on account information stored by the merchant. When an initial payment transaction is not successful, a resubmission schedule is determined. The resubmission schedule identifies particular time slots within which subsequent payment transactions are to be submitted. The time slots are selected to increase the likelihood of a successful payment transaction.

22 Claims, 8 Drawing Sheets

(56) References Cited

U.S. PATENT DOCUMENTS

| | | | | |
|---|---|---|---|---|
| 2013/0124263 A1* | 5/2013 | Amaro | ................... | G06Q 30/02 |
| | | | | 705/7.34 |
| 2013/0238489 A1* | 9/2013 | Bouey | .................. | G06Q 20/405 |
| | | | | 705/39 |
| 2014/0304158 A1* | 10/2014 | Basu | ...................... | G06Q 20/02 |
| | | | | 705/44 |
| 2016/0203484 A1* | 7/2016 | Blinov | ................. | G06Q 20/405 |
| | | | | 705/44 |

OTHER PUBLICATIONS

"Elan Financial Services Becomes One of First EFT Processors to Certify Automatic Biller Updater with MasterCard", Business Wire, Nov. 19, 2014. (Year: 2014).*

* cited by examiner

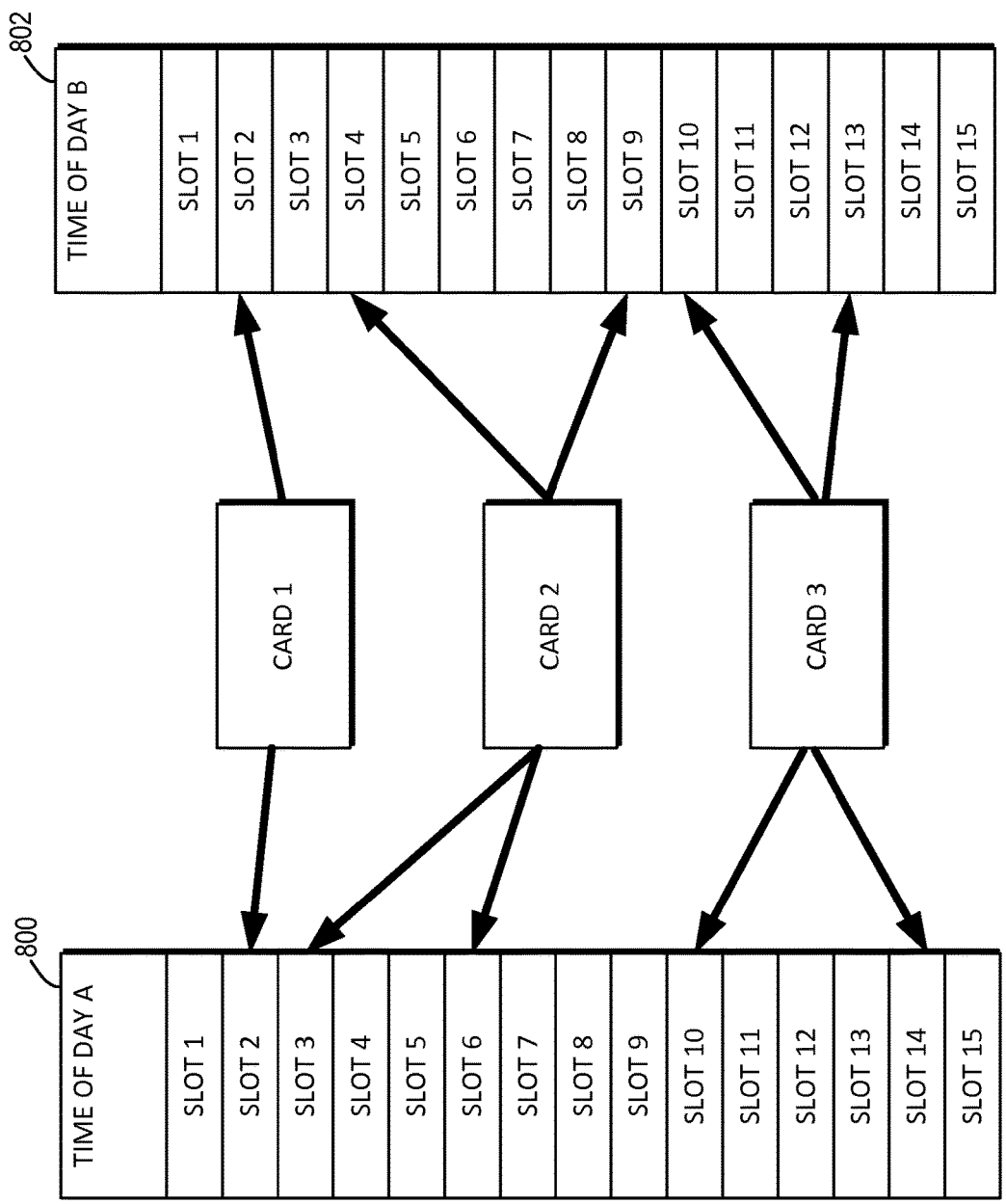

SYSTEMS AND METHODS FOR MANAGEMENT AND RECYCLING OF PAYMENT TRANSACTIONS

BACKGROUND

Transactions, including credit card transactions, are used for a great number of purchases and sales between merchants and cardholders. A normal card transaction can involve a number of parties, including an account holder who possesses a card, a merchant, an acquirer processor, an issuer processor, an issuer financial institution and a card association network. Millions of such transactions occur daily at merchants using a variety of payment card types, such as credit cards, debit cards, prepaid cards, and so forth. Some of these transactions are based on a recurring payment schedule and utilize account information received from an account holder during an initial payment transaction. A subsequent transaction based on that account information can be declined for a number of different reasons, such as non-sufficient funds, card expiration, expired account information, or a variety of other occurrences. Declined transactions can lead to a variety of undesirable outcomes for the merchant and the account holder.

BRIEF DESCRIPTION OF THE DRAWINGS

It is believed that certain embodiments will be better understood from the following description taken in conjunction with the accompanying drawings, in which like references indicate similar elements and in which:

FIGS. 6-9 schematically depict examples of resubmission time slots configurations that are associated with various payment cards in accordance with various non-limiting embodiments.

DETAILED DESCRIPTION

Figure 1:
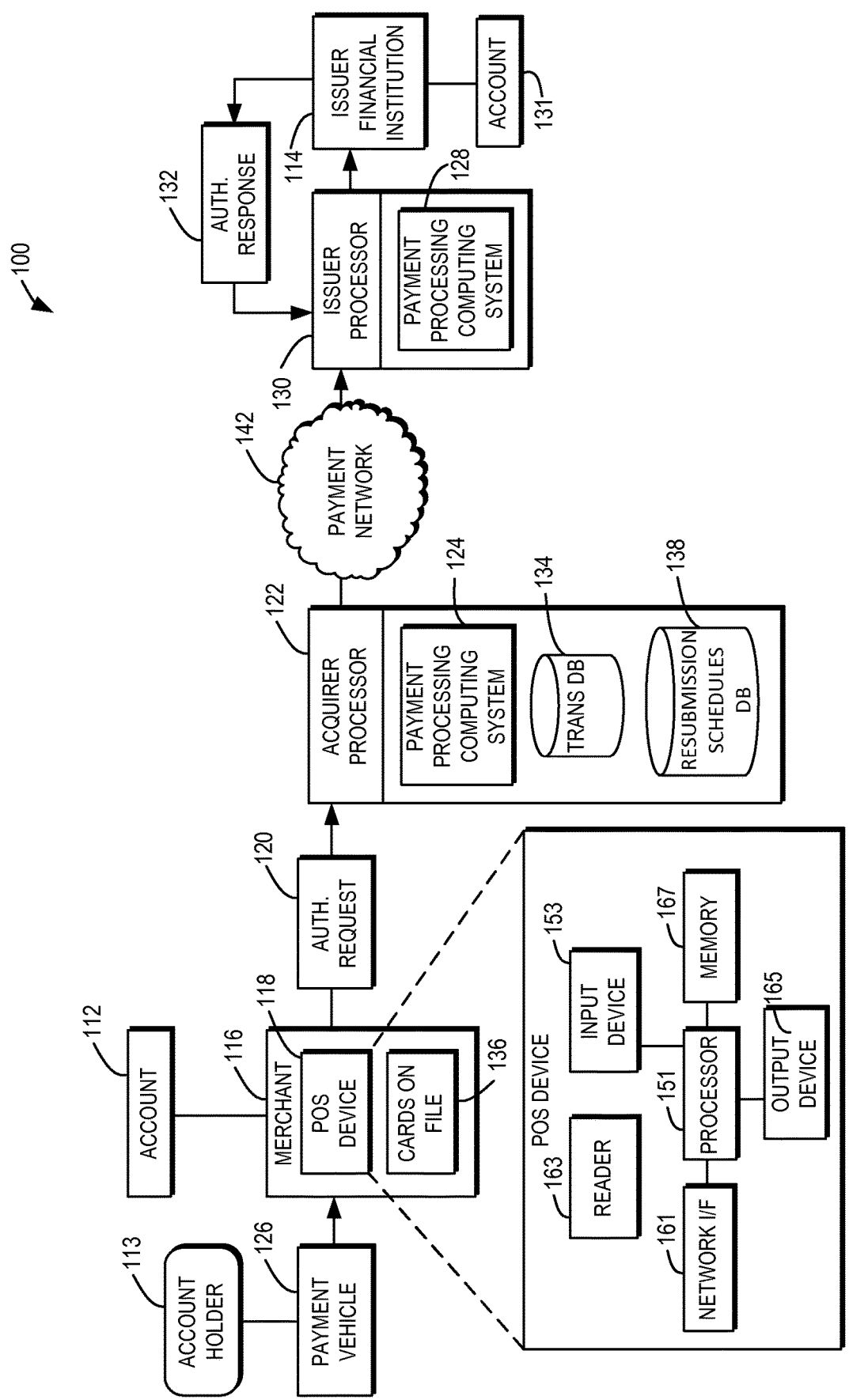
FIG. 1 depicts a block diagram of an example payment system incorporating various the recurring payment management functionalities.

Various non-limiting embodiments of the present disclosure will now be described to provide an overall understanding of the principles of the structure, function, and use of systems and methods disclosed herein for managing recurring payment transactions. One or more examples of these non-limiting embodiments are illustrated in the selected examples disclosed and described in detail with reference made to FIGS. 1-10 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

For simplicity, the description that follows will be provided by reference to a "payment vehicle," which generally refers to any type of financial alternative to currency. As is to be clear to those skilled in the art, no aspect of the present disclosure is specifically limited to a specific type of payment vehicle. Therefore, it is intended that the following description encompasses the use of the present disclosure with many other forms of financial alternatives to currency, including credit cards, debit cards, smart cards, single-use cards, pre-paid cards, electronic currency (such as might be provided through a cellular telephone or personal digital assistant), and the like. Payment vehicles can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A payment vehicle can also have electronic functionality provided by a network of electronic circuitry that is printed or otherwise incorporated onto or within the payment vehicle (and typically referred to as a "smart card"), or be a fob having a transponder and an RFID reader.

Some merchants have a need to utilize recurring transactions to periodically collect funds from a consumer. For convenience, the merchant can accept payment for an initial transaction using a payment vehicle that is received from the consumer. At a later point in time, and sometimes based on a particular payment schedule, the merchant can utilize account information received during the initial transaction to initiate a second transaction. These recurring billing arrangements can be used, for example, when a consumer agrees to pay a regular monthly, quarterly or annual fee for a product, service or membership. The dollar amount of each charge may vary depending on the product or service. Examples include health club memberships, insurance premiums, subscription fees, and so forth. As a result of supporting recurring transactions, merchants realize several benefits, such as timely payments, reduced processing time/cost and lower risk of error due to manual entry.

Recurring billing can also be used to in the context of installment billing plans, which allows a consumer to purchase a product in a defined number of installments, typically of equal value. Examples include direct response television (DRTV) products and many catalog products. By offering installment billing, merchants can achieve increased sales of higher ticket items, timely payments and lower risk of chargebacks.

In accordance with various embodiments, an acquirer processor associated with the merchant can generally manage the periodic generation of the transactional messaging to the appropriate payment networks. Such transaction messaging can be generated in accordance with recurring billing information originally received from the merchant, for example. In such embodiments, the acquirer processor can maintain account information on behalf of the merchant. In addition, some recurring transactions can be initiated by a merchant in an ad-hoc or as-needed fashion. For example, an automobile rental service will only need to charge a consumer upon that particular consumer renting a vehicle. At the time of the rental, the automobile rental service (i.e., the merchant) can use the account information of the renter that it has on file to initiate the transactions. Thus in some cases, at the request of the consumer, a merchant can use account holder information received during a previous transaction to initiate a subsequent transaction.

Over time, the account information maintained by the merchant can decrease in accuracy. For example, account information for a consumer can change over time. In the event of fraud or a lost card, for example, an issuer typically de-activates the card originally issued to the customer and issues a new card. At other times, account information may change when an account that has expired is renewed with a new expiration date. Alternatively, the account associated with the account information may have been closed. When the merchant attempts to conduct a payment transaction using the information it still has on file, the transaction will be declined. Additionally, merchants can encounter other types of difficulties when utilizing recurring billing techniques. If the account information held by the merchant is associated with a stored-value card or debit card, for example, the account being accessed for the transaction may not have sufficient funds at the time of the recurring transaction (i.e. sometime referred to herein as an NSF event).

In accordance with the present disclosure, and as described in more detail below, a transaction can be attempted again on a particular date at a particular point in time (or within a particular time slot), as determined at least in part by historical authorization success rates. In some embodiments, a resubmission schedule is determined for a particular payment vehicle that is calibrated to minimize, or at least reduce, the number of transactions needed to obtain an approval as there is a cost to the merchant associated with each attempt.

In some embodiments, one or more different payment transaction parameters can be used to determine a resubmission schedule, which can include determining one or more periods of time (sometimes referred to as time slots) within which an authorization should be sought. The payment transaction parameters can include, for example, a reason for a decline, payment vehicle parameters, the transaction amount, the merchant identifier, among other types of parameters. A resubmission schedule can be developed using any suitable analytical technique. In one embodiment, historical transaction data is mined to determine trends related to approval ratings based one particular payment card types, particular account holder segmentation, dates of transactions, and so forth. For particular datasets, calibrated resubmission schedules can be developed that are likely to result in querying an account when it has sufficient funds to cover the transaction. For example, resubmissions may be correlated to common payroll dates and/or points in time in the day when transaction communication traffic is usually at a minimum.

In some embodiments, the resubmission schedule is based at least partially on a particular date of a month (i.e., retry on the $5^{th}$ of the month, the $7^{th}$ of the month and the $12^{th}$ of the month). In some embodiments, the resubmission schedule is based at least partially on a particular day of a month (i.e., retry on first and second Fridays, retry on the first Wednesday, and so forth). In some embodiments, the resubmission schedule is based at least partially on the date on which the decline event occurred (i.e., retry 5, 7, and 11 days after the decline event). Further, in accordance with the present disclosure, a particular window of time on a particular day can be determined such that if the transaction request is initiated within that window of time, the likelihood of a successful transaction event can be increased.

By way of an operational example, when an initial transaction is declined, it can be determined that the transaction should be attempted again in 3 days and 5 days. Such determination can be based on any number of factors or variables, such as the Bank Identification Number (BIN), the Reason Response Code (RRC), among others. Further, it can be determined, in accordance with the present disclosure, that the transaction should be attempted within a certain time window on day 3 and the same (or different time) window on day 5. As described in more detail below, the time window can be presented in a variety of suitable formats, such as a block of time (i.e., retry within a particular 20 minute time slot, a particular 2 hour time slot, etc.), a time of day, and so forth. The present disclosure is not limited to any particular resubmission schedule, as the resubmission schedules are likely to vary cardholder to cardholder. Furthermore, any particular resubmission schedule can also change over time as more and more historical data is used to available to define the schedule.

FIG. 1 depicts a block diagram of an example payment system 100 incorporating various the recurring payment management functionalities. In the example payment system 100, a payment vehicle 126 (e.g., a credit card) can be issued to an account holder 113 by an issuer financial institution 114. The issuer financial institution 114 can be any of a variety of financial institutions that is capable of issuing a payment vehicle to an account holder. The payment vehicle 126 can be used to pay a merchant 116 for a purchase transaction at a merchant point of sale (POS) device 18. The merchant POS device 118 can be any device that facilitates receipt of a payment vehicle for payment of a purchase, such as for example, a POS terminal or a web interface. Further, it is to be appreciated that the merchant 116 can be any type of merchant or service provider, such as a brick-and-mortar merchant, an online merchant, a mobile merchant, a kiosk, or any other type of merchant or device configured to receive payment cards from account holders as a form of payment.

The POS device 118 is configured to interact with the payment vehicle 126 to obtain account information about a consumer account affiliated with the account holders 113. In one embodiment, the POS device 118 includes a memory 167 coupled to the processor 151, which controls the operations of a reader 163, an input device 153, an output device 165 and a network interface 161. The memory 167 may store instructions for the processor 151 and/or data, such as an identification that is associated with the merchant account 112.

In one embodiment, the reader 163 includes a magnetic strip reader. In another embodiment, the reader 163 includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, and so forth.

In one embodiment, the input device 153 includes key buttons that can be used to enter the account information directly into the POS device 118 without the physical presence of the payment vehicle 126. The input device 153 can be configured to provide further information to initiate a transaction, such as a personal identification number (PIN), password, zip code, etc., or in combination with the account information obtained from the payment vehicle 126. In one embodiment, the output device 165 may include a display, a speaker, and/or a printer to present information, such as the result of an authorization request, a receipt for the transaction, an advertisement, and so forth.

In one embodiment, the network interface 161 is configured to communicate with the acquirer processor 122 via a telephone connection, an Internet connection, or a dedicated data communication channel.

In one embodiment, the instructions stored in the memory 167 are configured at least to cause the POS device 118 to send an authorization request message to the acquirer processor 122 to initiate a transaction. The POS device 118 may or may not send a separate request for the clearing and settling of the transaction. The instructions stored in the memory 167 are also configured to cause the POS device 118 to perform other types of functions discussed in this description.

In one embodiment, a POS device 118 may have fewer components than those illustrated in FIG. 1. For example, in one embodiment, the POS device 118 is configured for "card-not-present" transactions; and the POS device 118 does not have a reader 163. In one embodiment, a POS device 118 may have more components than those illustrated in FIG. 1.

During a purchase event, the merchant POS device 118 can send an authorization request 120 for the purchase transaction to an acquirer processor 122 that processes payment vehicle transactions for the merchant 116. As is to be appreciated, additional intermediary entities, such as one or more payment gateways, may assist with the handling and routing of the authorization request 120 or other related messaging. For the purposes of illustration, such intermediary entities may be considered part of the acquirer processor 122. The authorization request 120 can include identifying information from the payment vehicle 126, such as a BIN number, an expiration date, and a first and last name of the account holder, for example. The authorization request 120 can also include identifying information from the purchase such as an amount and identifying information from the merchant POS device 118 and/or the merchant 116, for example.

In some embodiments, the payment vehicle 126 can be used to establish a recurring billing arrangement between the account holder 113 and the merchant 116. An initial transaction allows the merchant 116 to store account information which can be used for subsequent billing events. The account information can be stored in the cards-on-file storage 136. For example, the purchase event illustrated in FIG. 1 can be associated with a subscription, membership plan, installment payment plan between the merchant 116 and the account holder 113. For subsequent transactions, the merchant 116 can access the cards-on-file storage 136 to retrieve the relevant account information. The subsequent transactions do not necessarily need direct involvement from the account holder 113. In other embodiments, the account holder 113 triggers the subsequent transaction, but does not provide the payment vehicle to the merchant 116, as the merchant 116 can access the cardholder's account information in the cards-on-file storage 136.

A payment processing computing system 124 at the acquirer processor 122 can receive the authorization request 120 from the merchant 116. The payment processing computing system 124 can translate the authorization request 120, if necessary, and can provide the authorization request 120 to a payment network 142. The payment network 142 can be, for example, a network of a credit card association affiliated with the payment vehicle 26. Non-limiting examples of credit card associations include VISA, MASTERCARD, DISCOVER, and AMERICAN EXPRESS. The authorization request 120 can then be provided to a payment processing computing system 128 at an issuer processor 130. In response to receiving the authorization request, and based on the type of payment vehicle 126, the payment processing computing system 128 may provide the authorization request 120 to the issuer financial institution 114. Using information from the authorization request, the issuer financial institution 114 can associate the purchase transaction with an account 131 of the account holder 113 held by the issuer financial institution 114. The issuer financial institution 114 can then send an authorization response 132 which can either approve or deny the transaction. The authorization response 132 can be provided to the payment processing computing system 128 at the issuer processor 130 and then provided to the payment network 142. The authorization response 132 can then be provided to the payment processing computing system 124 at the acquirer processor 122. Upon receiving the authorization response 132, the payment processing computing system 124 can send either an approval message or a denial message to the merchant POS device 118 to complete the purchase transaction. If the purchase transaction is approved, it can be posted to the account holder's account 131 and reconciled later with the account holder 113 and the merchant 116.

Transaction records can be stored in one or more locations within the system 100. In one embodiment, the transaction record can stored within a transaction data database 134 of the acquirer processor 122. The transaction data can be received by the transaction data database 134 from various sources, such as the merchant POS device 118, the merchant 116, the acquirer processor 122, and so on. A plurality of transaction parameters associated with the purchase transaction can be stored in each transaction record which can generally be used for settlement and financial recordkeeping. While the transaction parameters stored in each transaction record can vary, example transaction parameters can include, without limitation, account number, card number, payment vehicle information, product information (such as product type, product serial number, and so forth), transaction amount, loyalty account information, merchant information, transaction amount, response code, transaction date, transaction time, whether the transaction was a "card present" transaction, and so on. One or more resubmission schedules can also be stored in one or more locations within the system 100. In one embodiment, resubmission schedules can stored within a resubmission schedules database 138 of the acquirer processor 122. The resubmission schedules can include directives to re-trying the processing of a recurring payment transaction when the first attempt fails.

For convenience, the first transaction in a recurring billing arrangement between the merchant 116 and the account holder 113 will be referred to herein as the "initial payment transaction." Subsequent transactions, in accordance with the billing arrangement, using account information stored by either the merchant 116 and/or the acquirers processor 122 will be referred to herein as a "scheduled payment transaction." As is to be appreciated, the scheduled transactions can be generally continue for perpetuity until the billing arrangement is changed (i.e., for insurance premiums, recurring membership dues, and so forth.) Alternatively, the schedule transactions can be more limited in nature, where only a defined number of scheduled transactions will occur (i.e. for an installment billing plan). In other embodiments, the scheduled payment transaction will be an ad-hoc billing event using the cards-on-file storage 136.

Figure 2:
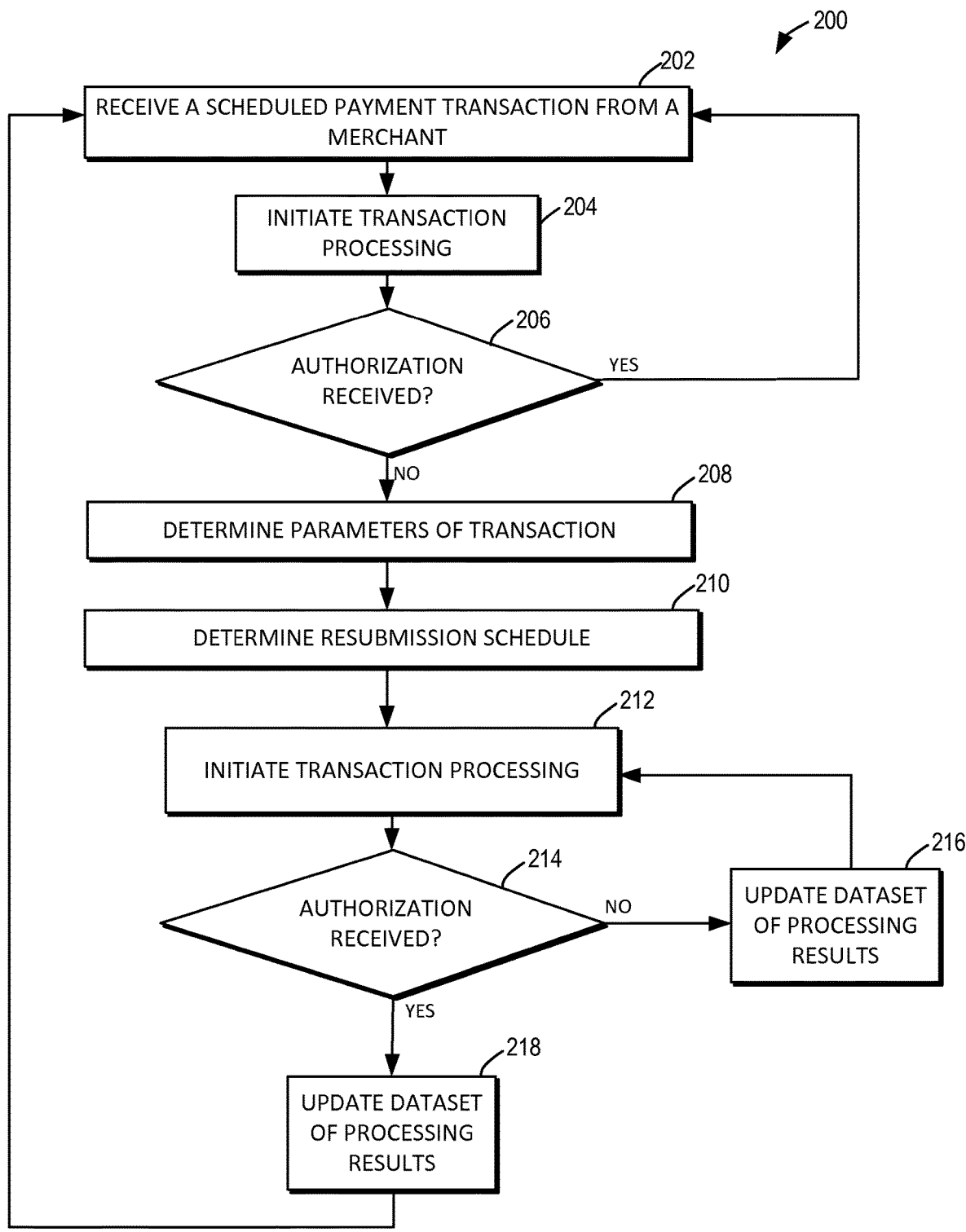
FIG. 2 depicts an example process flow in accordance with one embodiment.

FIG. 2 depicts an example process flow 200 in accordance with one embodiment. Referring to FIGS. 1-2, at 200 a scheduled payment transaction is received from the merchant 116. In some embodiments, the scheduled payment transaction is received by the acquirer processor 122. The scheduled payment transaction can include typical transaction data, such as a transaction amount, an account identifier, a merchant identifier, and so forth. At least some of the transaction data transmitted in the scheduled payment transaction can include data that was originally received by the merchant 116 during an initial payment transaction originating with the payment vehicle 126 and stored in the cards-on-file storage 136.

At 204, transaction processing is initiated. This transaction processing can be an initial payment transaction, for example. Depending on the type of payment vehicle and/or other transaction parameters, the transaction processing can include communications with a payment network, communication with a prepaid platform, among other types of communications, examples of which are described with regard to FIG. 1. At 206, it is determined if authorization is received. If authorization was received, the transaction was successful and the process can loop back to 202 to await the next transaction. If, however, the authorization was not received, the process proceeds to 208 where parameters of the transaction are determined so that a resubmission schedule can be prepared. The particular parameters for a transaction can vary, but in some embodiments, parameters that can be considered are Bank Identification Number (BIN), Merchant Identification Number (MID), Merchant Category Code (MCC), Reason Response Code (RRC), amount of transaction, payment vehicle type and/or account holder name, for example.

At 210, based on one or more of the transaction parameters, a resubmission schedule is determined. The structure of the resubmission schedule can vary. In some embodiments, the resubmission schedule identifies one or more dates for subsequent scheduled payment transactions. The dates can be identified by a passage of time (i.e., in 5 days and in 7 days) or by particular dates (i.e., March 19 and March 24). In some embodiments, the dates can be identified periodically (i.e., every 2 days or every 4 days). The resubmission schedule can also identify one or more transaction initiation time slots within the one or more dates. The transaction initiation time slots can be same across all the dates in a particular resubmission schedule, or the transaction initiation time slots can vary date to date. Additional details regarding example transaction initiation time slots are provided below with regard to FIGS. 6-8.

Still referring to FIG. 2, at 212, transaction processing is initiated based on the resubmission schedule. Accordingly, the transaction processing can be initiated on a certain date within a certain time slot, in accordance with the resubmission schedule. At 214, it is determined if an authorization is received. If an authorization was not received, the process can update the dataset of processing results at 216 to indicate that the authorization request was not successful thereby provide additional data for future analysis. The process then loops back to 212 so that an additional subsequent scheduled payment transaction can be initiated on the next date and within the time slot identified by the resubmission schedule as determined at 208, or may be based on an updated resubmission schedule. At 212, the next transaction is initiated and if an authorization was received, the process can update the dataset of processing results at 218 to indicate that the authorization request was successful. The process then can loop back to 202 to await the next schedule payment.

Figure 3:
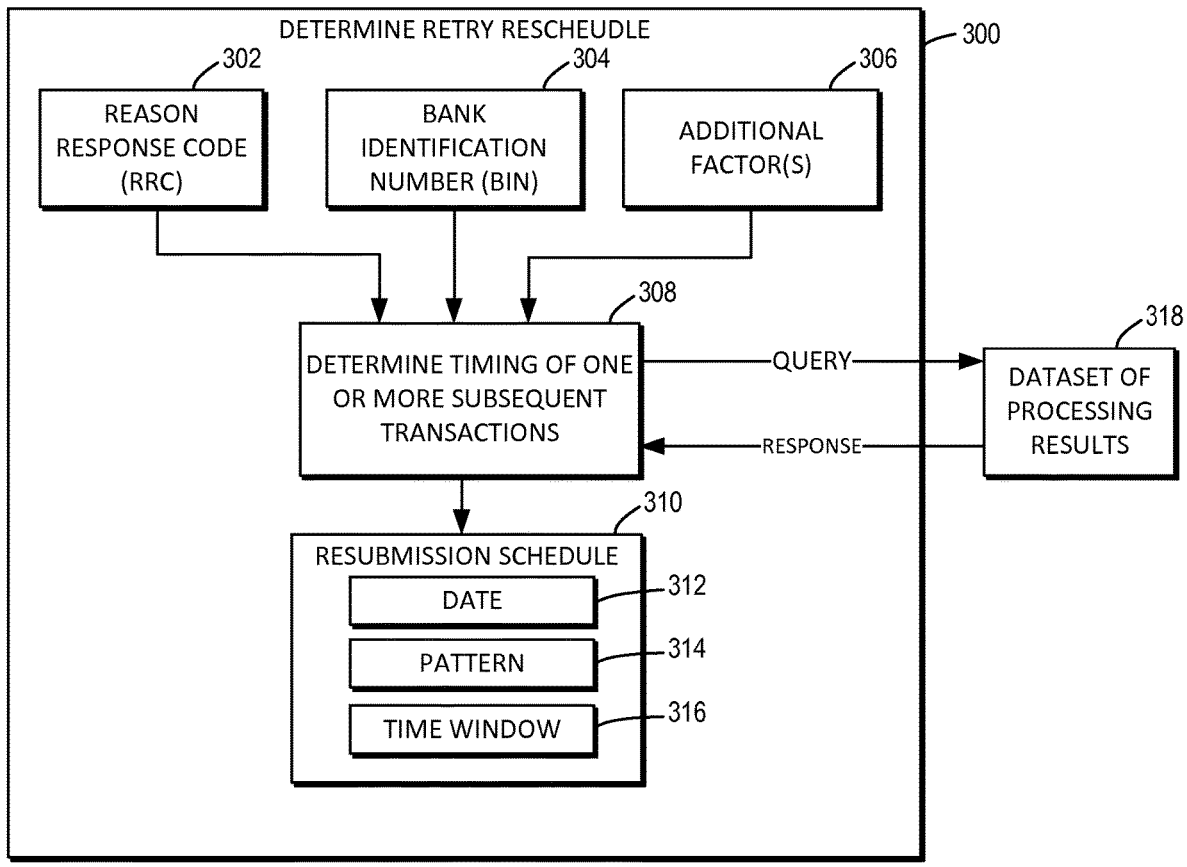
FIG. 3 schematically depicts an example determination of a resubmission schedule in accordance with one embodiment.

FIG. 3 schematically depicts an example determination of a resubmission schedule 300. The determination can be based on one or more factors, schematically illustrated as a Reason Response Code (RRC) 302 and a Bank Identification Number (BIN) 304. Additionally or alternatively, other factors can be used (as shown as additional factors 306), which can include, but are not limited to, Merchant Identification Number (MID), Merchant Category Code (MCC), amount of transaction, payment vehicle type and/or account holder name, for example. In some embodiments, one or more of these factors can be used to determine the timing parameters of subsequent transactions. The timing can establish, for example, that transactions should be attempted again in 3 days and 5 days, on particular days of the month (either by days of the week or dates), or any other timing scenarios. Determining the timing can also establish one or more time windows within which the subsequent payment transactions can be initiated. In this regard, additional granularity is provided into the resubmission schedule in an attempt to increase the likelihood of a successfully authorization request. As shown, a dataset of processing results 318 can be utilized in making the timing determination. In some embodiments, the dataset of processing results 318 is gathered from the transaction data database 134 (FIG. 1). The dataset of processing results 318 can generally include historical transaction data that can be correlated to one of more of the factors, such as a Reason Response Code (RRC) 302 and/or a Bank Identification Number (BIN) 304. The determination of the timing of one or more subsequent transactions can result in the production of a resubmission schedule 310. The resubmission schedule 310 can be built using any suitable rules, such as a date rule 312 or a pattern rule 314. The date rule 312 can indicate, for example, a date of the month to initiate subsequent transactions. The pattern rule 314 can indicate the subsequent transaction timing based on an amount of time that is to pass between successive attempts, such as wait 4 days for the first subsequent attempt and then wait 2 days for the second subsequent attempt. The resubmission schedule 310 can also include a time window rule 316 that indicates a particular time slot that the subsequent transaction attempt should be initiated. The period of time within a given time slot may vary, but in some embodiments, the time slots have approximately 20 minutes. Other embodiments, can utilize larger or small time slots without departing from the scope of the present disclosure. The resubmission schedule 310 can be stored in the resubmission schedules database 138.

Figure 4:
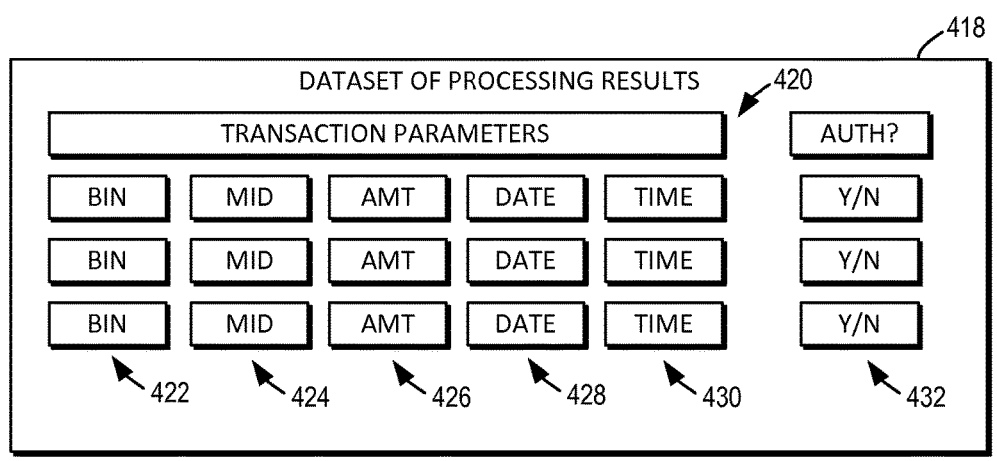
FIG. 4 schematically depicts a dataset of processing results in accordance with one embodiment.

FIG. 4 schematically depicts a dataset of processing results 418. The dataset of processing results 418 can include historical transaction information that can be processed and analyzed in order to ascertain trends and/or correlations to determine the resubmission schedule 310 (FIG. 3). The scope of the dataset of processing results 418 can vary, but in the illustrated embodiment transaction parameters 420 that are tracked within the dataset include a BIN 422, a MID 424, a transaction amount 426, a transaction data 428, and a transaction timestamp 430. The dataset also indicates whether the particular combination of transaction parameters 420 led to an authorization 432. Further, while the dataset of processing results 418 can include many different transaction parameters 420, in some embodiments only a subset of the parameters can be used for determining a resubmission schedule 310. Furthermore, a first subset of parameters can be used to determine the pattern of the resubmission schedule and a second subset of parameters can be used to determine the time window(s) for the subsequent transaction events. The first and second subsets may or may not include the same transaction parameters.

Figure 5:
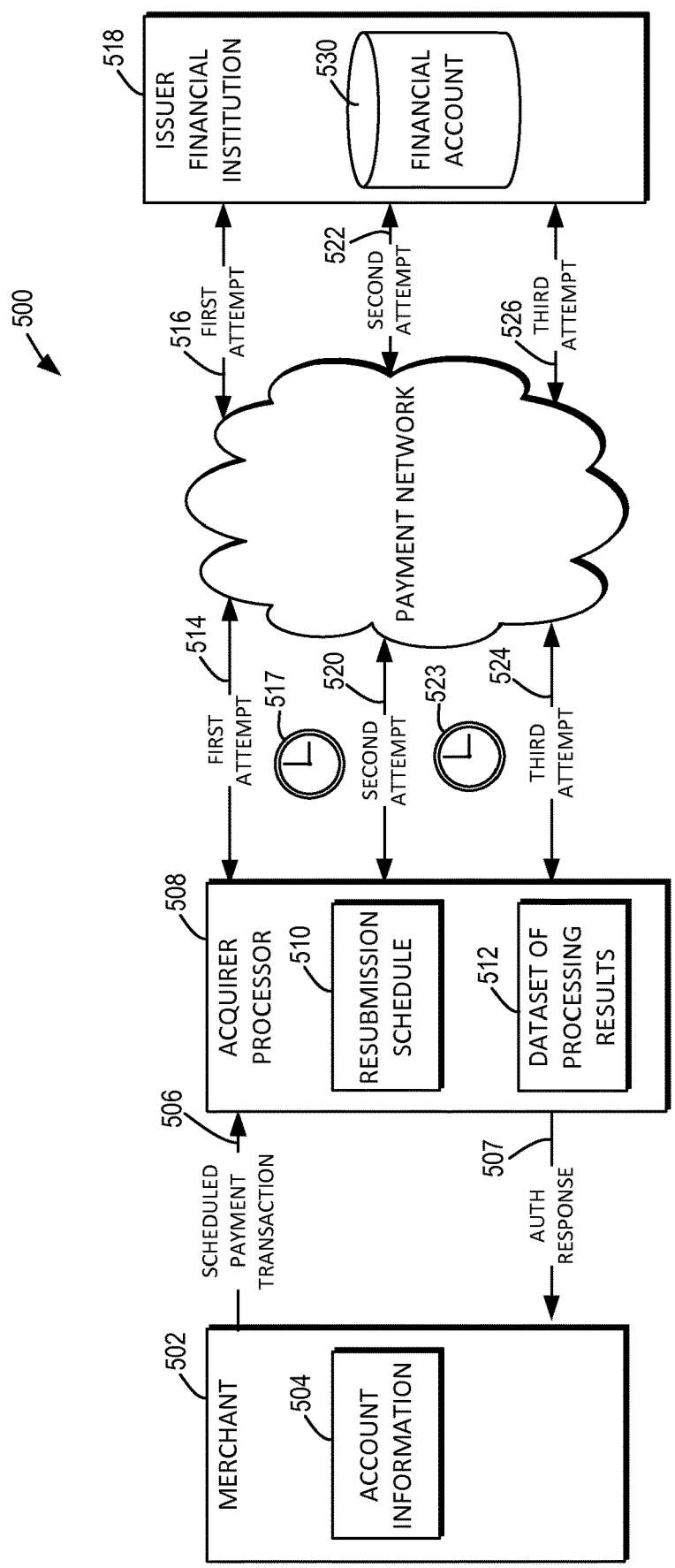
FIG. 5 depicts a process flow for a system for an example embodiment.
Figure 7:
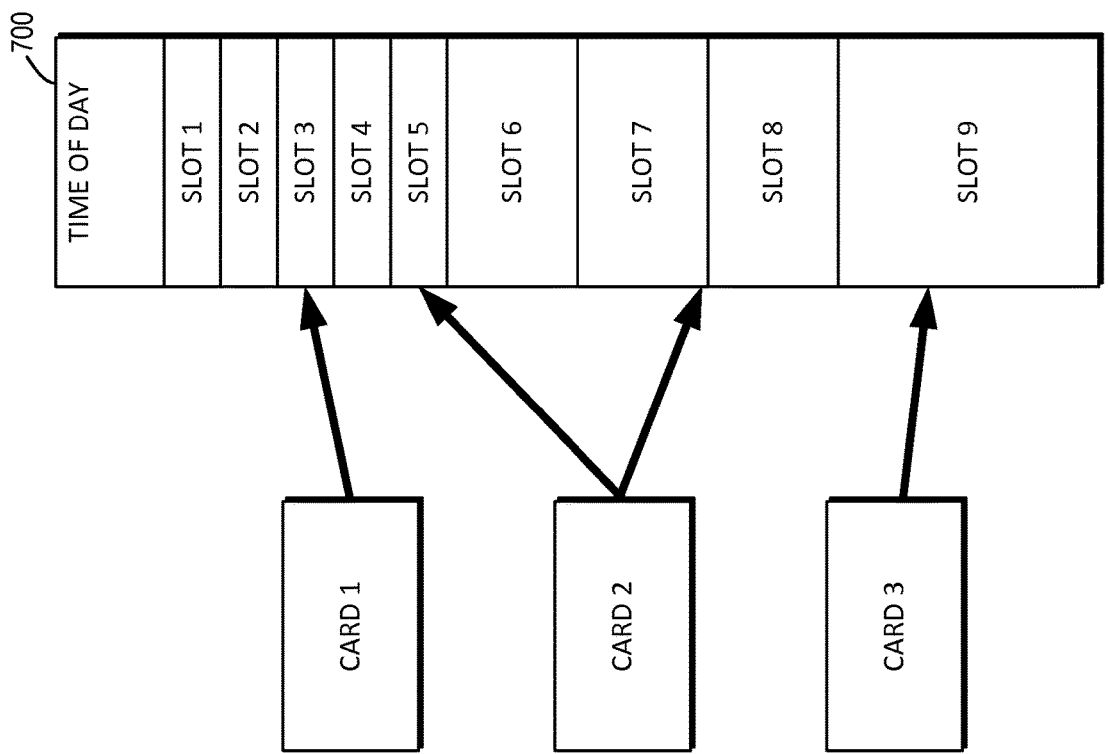

FIG. 5 depicts a process flow for a system 500 for an example embodiment. A scheduled payment transaction 506 is received from a merchant 502 by an acquirer processor 508. The scheduled payment transaction 506 can be based on account information 504 maintained by the merchant 502, or elsewhere, as may be appropriate. The scheduled payment transaction can include typical transaction data, such as an amount, an account identifier, a BIN, a merchant identifier, and so forth. At least some of the transaction data transmitted in the scheduled payment transaction can include data that was originally received by the merchant 502 during an initial payment transaction originating with a payment vehicle and stored in cards-on-file storage, for example. A payment processing computing system of the acquirer processor 508 can determine the card association that is affiliated with the scheduled payment transaction 509 (e.g., VISA, MASTERCARD, and so forth), to determine the proper processing channels for the transaction.

The acquirer processor 508 can transmit a first authorization attempt 514 to a payment network, which in turn can transmit a first authorization attempt 516 to an issuer financial institution 518. The issuer financial institution 518 may approve or reject the authorization request based on a status of a financial account 530 associated with the transaction, for example, with an authorization response 507 provided to the merchant 502. The financial account 530 can be any suitable account, such as DDA account, a gift card account, a prepaid account, or any other type of account that can be linked to or accessed by payment vehicle. The available account balance of the financial account 530 may vary over time as the account holder withdraws funds and deposits funds. The first authorization attempt may be rejected for any number of reasons, such as non-sufficient funds, out-of-date account information, and so forth. In any event, if this first authorization attempt is not successful, transaction factors can be used to determine a resubmission schedule 510. As described above, the transaction factors can include BIN number, RRC, and so forth. The dataset of processing results 512 can be used to determine the resubmission schedule 510 based on the transaction factors. In accordance with the present disclosure, the resubmission schedule 510 can identify a first date and a first time slot for a second transaction attempt and a second date and a second time slot for a third transaction attempt. The acquirer processor 508 can then wait (schematically shown as delay 517) until the identified date and time slot arrives and then submits the second authorization attempt 520 to the payment network, which in turn transmits a second authorization attempt 522 to the issuer financial institution 518. The delay 517 can be temporal based (i.e., X number of days after the first attempt), date based (i.e., delay until the Xth of the month), day of the week based (i.e., delay until a Friday), or any other delay paradigm. As illustrated, if this second authorization attempt is not successful, a third authorization attempt, based on the resubmission schedule 510 can be submitted at the appropriate time. Namely, the acquirer processor 508 can then wait (schematically shown as delay 523) until the next identified date and time slot arrives and submits the third authorization attempt 524 to the payment network, which in turn transmits a third authorization attempt 526 to an issuer financial institution 518. During the delay between the second attempt 322 and the third attempt 526, the available balance in the financial account 530 may have been increased, or other impediments to obtaining a successful authorization may have been removed, such as an account updater function may have completed.

Figure 6:
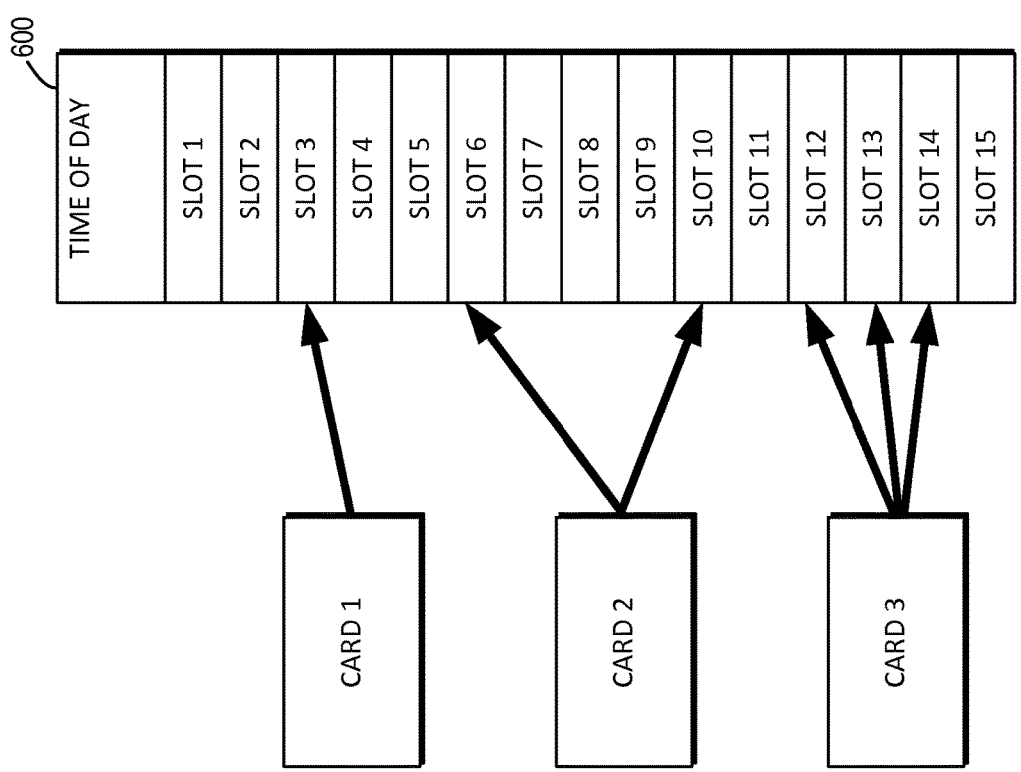

FIGS. 6-9 schematically depict examples of resubmission time slots configurations that are associated with various payment cards in accordance with various non-limiting embodiments. Referring first to FIG. 6, a day 600 is shown separated into 15 timeslots. While 15 time slots are shown, any suitable number of time slots can be implemented. By way of example, for embodiments utilizing 20 minute time slots, each day would have 72 available timeslots. Embodiments utilizing one hour time slots would have 24 available timeslots. Depending on card parameters, transaction parameters, and/or other factors, various cards can be linked to particular time slots for scheduled payment transactions. As illustrated, time slot 3 has been identified as an optimal, or at least preferred, time slot for transactions utilizing card 1. In some embodiments, more than one time slot may be identified as being viable for scheduled payment transactions. Time slots 6 and 10 have been identified as optimal, or at least preferred, time slots for transactions utilizing card 2. In some embodiments, for any initially rejected transaction, a block of time slots can be identified for subsequent transaction attempts. Time slots 12-14 have been identified as optimal, or at least preferred, time slots for transactions utilizing card 3. As described above, the time slots identified for each card in FIG. 6 can be determined based on the analysis of historical data for cards having similar parameters of the cards. For example, the time slots may be at a point in the day where transaction volume tends to be lower, thereby decreasing the chance of undesirable data collisions or other processing failures.

While FIG. 6 schematically depicts the time slots as being of similar length, this disclosure is not so limited. For example, referring to FIG. 7, the time slots depicted for the day 700 are not of equal length, with slots 6-8 having a longer duration than slots 1-5, and slot 9 having a longer duration than slot 6-8. Such time slot format can be used to reduce processing time when determining submission schedules, with the longer time slots being used when granularity does not necessarily increase likelihood of a successful authorization. By way of example, slot 9 could be the time period from 2:30 AM-5:00 AM (when processing volume is typically at a minimum) and time slots 1-5 could divide the time period from 11:00 AM to 2:00 PM (when high processing volume is typically expected).

In some embodiments, a dataset of processing results can be analyzed to determine preferred time slots on a per-day basis. In other words, as shown in FIG. 8, a first set of time slots may be identified on a first day 802 (shown as Day A) and a second set of time slots may be identified on a second day 804 (shown as Day B). In some embodiments, Day A may be a first day of the week and Day B may be a second day of the week. In some embodiments, Day A may represent weekdays and Day B may represent weekends days. Further, while the time slots in Day A and Day B are schematically shown as being similarly sized, it is to be appreciated that in some embodiments, the time slots can vary in length.

Figure 9:
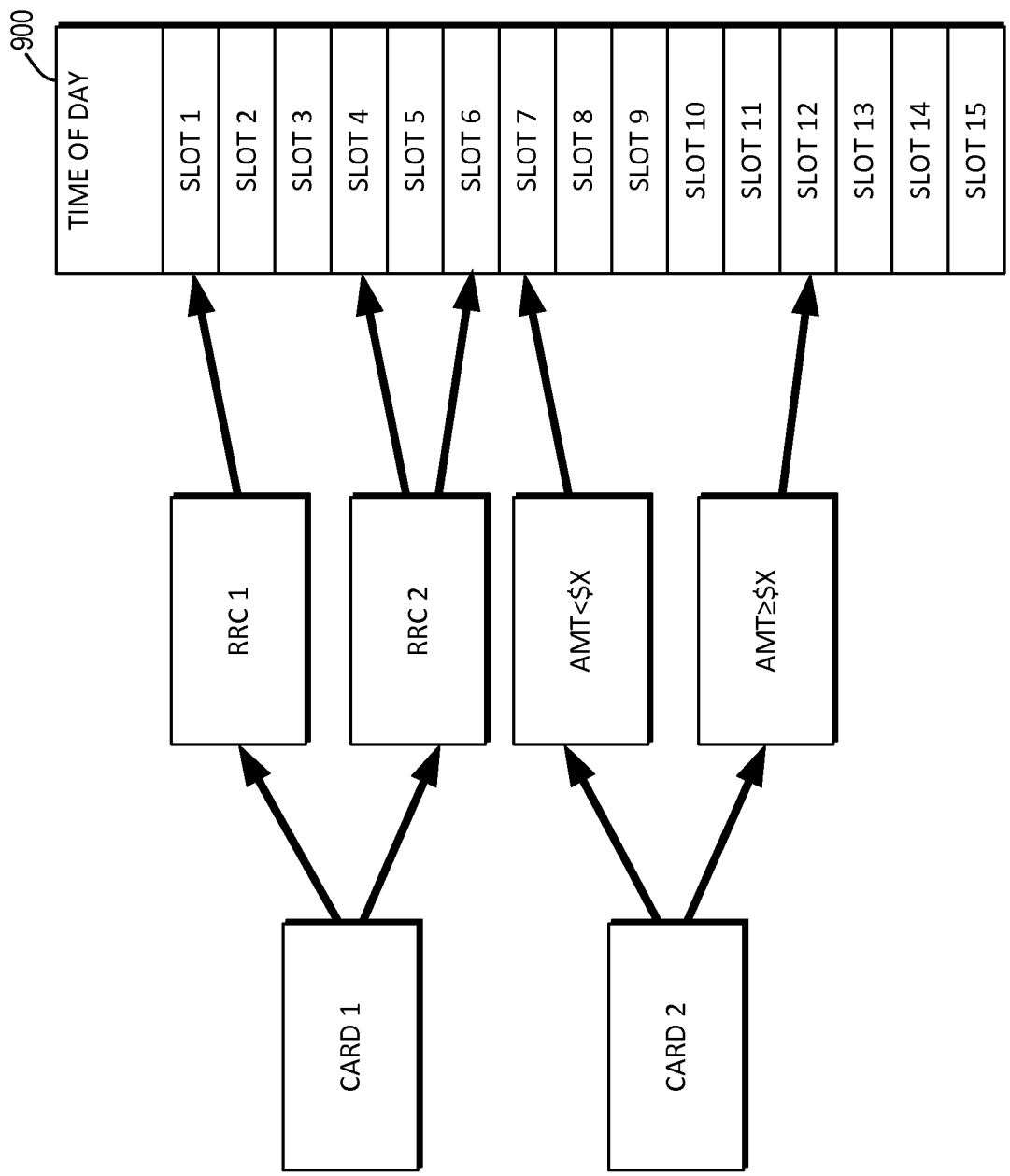

FIG. 9 schematically depicts how various transaction factors can impact the preferred time slots that are identified for a particular card. Referring first to card 1, two different RRC codes are provided (shown as RRC 1 and RRC 2). Depending on the RRC received for the initial transaction, different time slots of day 900 can be identified in the resubmission schedule. Referring next to card 2, in some embodiments, the amount of the transaction can be used to determine which time slots to identify for subsequent transactions. As is to be appreciated, any number of transaction factors can be combined to arrive at one or more preferred time slots for a particular transaction.

Figure 10:
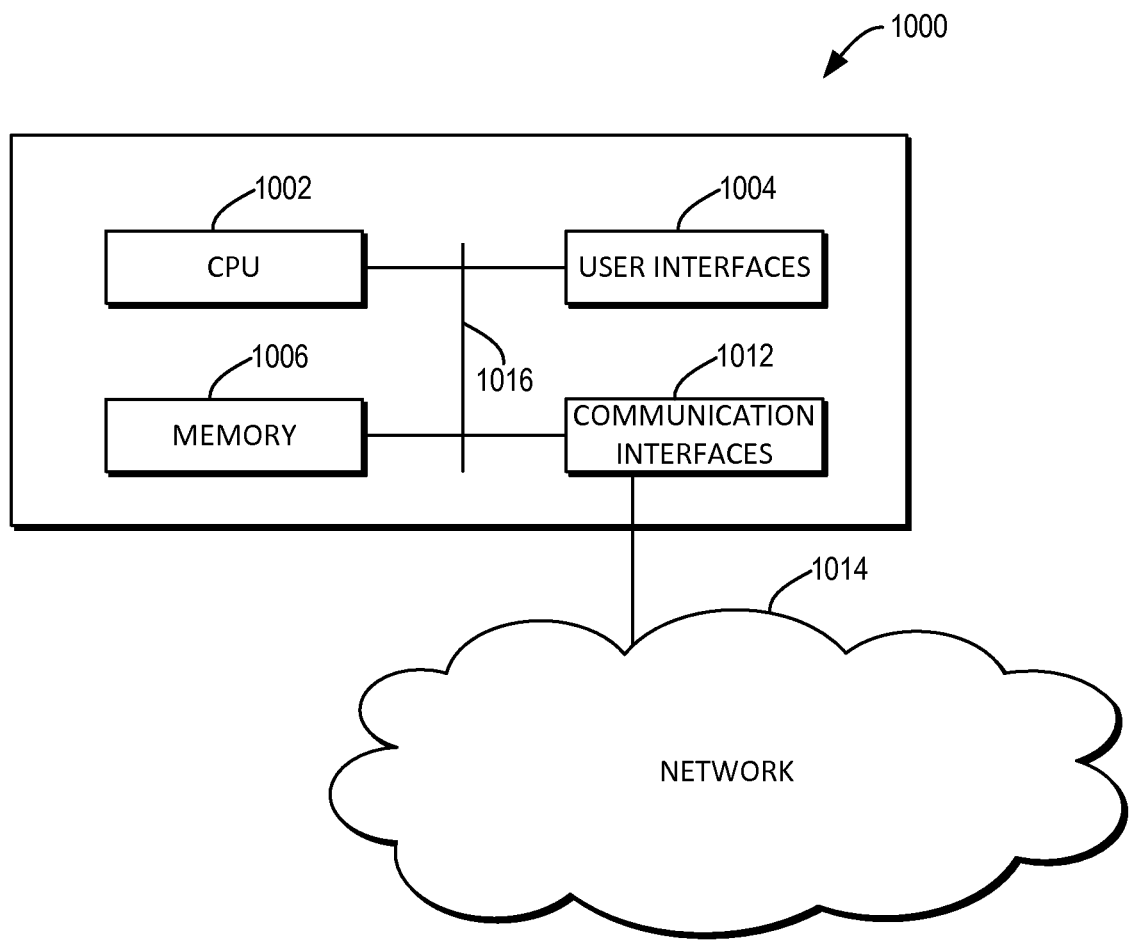
FIG. 10 depicts an example computing device.

The processes described herein can be performed on or between one or more computing devices that are specially configured to perform the processing described herein. Referring now to FIG. 10, an example computing device 1000 is presented. A computing device 1000 can be a server, a computing device that is integrated with other systems or subsystems, a mobile computing device, a cloud-based computing capability, and so forth. The computing device 1000 can be any suitable computing device as would be understood in the art, including without limitation, a custom chip, an embedded processing device, a tablet computing device, a POS device 118, a payment processing computing system 124, a payment processing computing system 128, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 1000 includes a processor 1002 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 1000 also includes one or more memories 1006, for example read only memory (ROM), random access memory (RAM), cache memory associated with the processor 1002, or other memories such as dynamic RAM (DRAM), static ram (SRAM), programmable ROM (PROM), electrically erasable PROM (EEPROM), flash memory, a removable memory card or disk, a solid state drive, and so forth. The computing device 1000 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 1002, or memories 1006 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 1012 can be configured to transmit to, or receive data from, other computing devices 1000 across a network 1014. The network and communication interfaces 1012 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 1012 can include wired data transmission links such as Ethernet and TCP/IP. The communication interfaces 1012 can include wireless protocols for interfacing with private or public networks 1014. For example, the network and communication interfaces 1012 and protocols can include interfaces for communicating with private wireless networks such as a WiFi network, one of the IEEE 802.11x family of networks, or another suitable wireless network. The network and communication interfaces 1012 can include interfaces and protocols for communicating with public wireless networks 1012, using for example wireless protocols used by cellular network providers, including Code Division Multiple Access (CDMA) and Global System for Mobile Communications (GSM). A computing device 600 can use network and communication interfaces 1012 to communicate with hardware modules such as a database or data store, or one or more servers or other networked computing resources. Data can be encrypted or protected from unauthorized access.

In various configurations, the computing device 1000 can include a system bus 1016 for interconnecting the various components of the computing device 1000, or the computing device 1000 can be integrated into one or more chips such as programmable logic device or application specific integrated circuit (ASIC). The system bus 1016 can include a memory controller, a local bus, or a peripheral bus for supporting input and output devices 1004, and communication interfaces 1012. Example input and output devices 1004 include keyboards, keypads, gesture or graphical input devices, motion input devices, touchscreen interfaces, one or more displays, audio units, voice recognition units, vibratory devices, computer mice, and any other suitable user interface.

The processor 1002 and memory 1006 can include non-volatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein. Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

What is claimed is:

1. A computer-implemented method for resubmitting transaction requests, comprising:

receiving, at an acquirer computing system, a first authorization request for a first payment transaction from a merchant computing system, the first payment transaction of a recurring billing arrangement, the recurring billing arrangement including the first payment transaction and one or more scheduled payment transactions, the first authorization request including account information of an account associated with a payment card network and an issuer processor;

transmitting, by the acquirer computing system, the first authorization request for the first payment transaction to the issuer processor;

receiving, at the acquirer computing system, a denial message from the issuer processor in response to the transmitted first authorization request;

generating a resubmission schedule at the acquirer computing system, the resubmission schedule being based on one or more of a predefined date rule specifying a day of the month, a common payroll date, a predefined pattern rule specifying an amount of time to elapse, and a predefined time window rule specifying a time slot or a time of day, wherein the generated resubmission schedule is configured to reduce a number of transactions to obtain an approval from the issuer processor; and transmitting, by the acquirer computing system, a second authorization request to the issuer processor based on the generated resubmission schedule, wherein the second authorization request is for a first scheduled payment transaction of the one or more scheduled payment transactions.

2. The computer-implemented method of claim 1, wherein the generated resubmission schedule is based on at least one transaction parameter.

3. The computer-implemented method of claim 2, wherein the at least one transaction parameter comprises any of a method of payment, a Bank Identification Number (BIN), a Reason Response Code (RRC) received with the denial message, and a transaction amount.

4. The computer-implemented method of claim 3, wherein the generated resubmission schedule identifies i) a day of the week for transmitting the second authorization request and ii) a time slot identifying a window of time of that day of the week.

5. The computer-implemented method of claim 3, wherein the generated resubmission schedule identifies i) a day of the month for transmitting the second authorization request and ii) a time slot identifying a window of time of the day of the month for transmitting the second authorization request.

6. The computer-implemented method of claim 3, wherein the generated resubmission schedule identifies i) a periodic schedule for resubmission of the second authorization request and ii) a time slot identifying a window of time of each day on the periodic schedule.

7. The computer-implemented method of claim 1, wherein the recurring billing arrangement is based on an installment payment obligation.

8. The computer-implemented method of claim 1, wherein the recurring billing arrangement is based on any of a subscription obligation and an installment payment obligation.

9. The computer-implemented method of claim 1, wherein the time slot identifies a period of time.

10. The computer-implemented method of claim 9, wherein the period of time is determined based at least in part on a number of available time slots for a day.

11. The computer-implemented method of claim 1, wherein the time slot is selected from a set of preferred time slots associated with the first authorization request.

12. The computer-implemented method of claim 1, wherein the time slot or time of day is selected based at least in part on time when transaction communication traffic is usually at a minimum.

13. The computer-implemented method of claim 1, further comprising:

receiving, at the acquirer computing system, a denial message from the issuer processor in response to the transmitted second authorization request; and transmitting, by the acquirer computing system, a third authorization request to the issuer processor based on the generated resubmission schedule, wherein the third authorization request is for a second scheduled payment transaction of the one or more scheduled payment transactions.

14. A non-transitory computer readable medium having instructions stored thereon which when executed by a processor cause the processor to:

receive a first authorization request for a first payment transaction from a merchant computing system, the first payment transaction of a recurring billing arrangement, the recurring billing arrangement including the first payment transaction and one or more scheduled payment transactions, the first authorization request including account information of an account that is associated with a payment card network and an issuer processor, and wherein the account information is stored by the merchant computing system;

transmit the first authorization request for the first payment transaction to the issuer processor;

receive a denial message in response to the transmitted first authorization request;

generate a resubmission schedule, the resubmission schedule being based on one or more of a predefined date rule specifying a day of the month, a common payroll date, a predefined pattern rule specifying an amount of time to elapse, and a predefined time window rule specifying a time slot or a time of day, wherein the generated resubmission schedule is configured to reduce a number of transactions to obtain an approval from the issuer processor; and transmit a second authorization request to the issue processor based on the generated resubmission schedule, wherein the second authorization request is for a first scheduled payment transaction of the one or more scheduled payment transactions.

15. The non-transitory computer readable medium of claim 14, wherein the generated resubmission schedule is based on at least one a response code received with the denial message and a Bank Identification Number (BIN) identified in the authorization request.

16. The non-transitory computer readable medium of claim 15, wherein the generated resubmission schedule identifies any of: a day of the week, a day of the month, and a periodic schedule for transmitting the second authorization request.

17. The non-transitory computer readable medium of claim 16, wherein the recurring billing arrangement is based on an installment payment obligation.

18. The non-transitory computer readable medium of claim 16, wherein the recurring billing arrangement is based on a subscription obligation.

19. An acquirer computing system for receiving authorization requests for a plurality of merchants and communicating with one or more payment networks, the acquirer computing system comprising a non-transitory computer readable medium having instructions stored thereon which when executed by a processor cause the processor to:

receive a first authorization request for a first payment transaction from a merchant computing system, the first payment transaction of a recurring billing arrangement, the recurring billing arrangement including the first payment transaction and one or more scheduled payment transactions, the first authorization request including account information of an account that is associated with a payment card network and an issuer processor;

transmit the first authorization request for the first payment transaction to the issuer processor of the account information identified by the first authorization request;

receive a denial message from the issuer processor in response to the transmitted first authorization request;

generate a resubmission schedule, the resubmission schedule being based on one or more of a predefined date rule specifying a day of the month, a common payroll date, a predefined pattern rule specifying an amount of time to elapse, and a predefined time window rule specifying a time slot or a time of day, wherein the generated resubmission schedule is configured to reduce a number of transactions to obtain an approval from the issuer processor; and transmit a second authorization request to the issuer processor based on the generated resubmission schedule, wherein the second authorization request is for a first scheduled payment transaction of the one or more scheduled payment transactions.

20. The acquirer computing system of claim 19, wherein the generated resubmission schedule identifies one of: a day of the week, a day of the month, and a periodic schedule for transmitting the one or more scheduled payment transactions.

21. The acquirer computing system of claim 19, wherein the time slot or period of time is determined based at least in part on analysis of data of one or more payment transactions having parameters that are at least similar to parameters associated with the transmitted first authorization request.

22. The acquirer computing system of claim 19, wherein the generated resubmission schedule identifies a plurality of time slots, wherein the second authorization request is to be submitted in at least one of the plurality of time slots.

* * * * *